(12) United States Patent
Wei (10) Patent No.: US 10,447,916 B2
(45) Date of Patent: *Oct. 15, 2019

(54) DUAL-CAMERA FOCUSING METHOD AND APPARATUS, AND TERMINAL DEVICE

(71) Applicant: GUANGDONG OPPO MOBILE TELECOMMUNICATIONS CORP., LTD., Dongguan, Guangdong (CN)

(72) Inventor: Yi Wei, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/358,955

(22) Filed: Mar. 20, 2019

(65) Prior Publication Data

US 2019/0222745 A1  Jul. 18, 2019

Related U.S. Application Data

(63) Continuation of application No. 15/805,930, filed on Nov. 7, 2017, now Pat. No. 10,284,770.

(30) Foreign Application Priority Data

Nov. 29, 2016 (CN) .......................... 2016 1 1079319

(51) Int. Cl.
| | |
|---|---|
| *H04N 5/232* | (2006.01) |
| *H04N 5/247* | (2006.01) |
| *G03B 13/36* | (2006.01) |
| *H04N 5/225* | (2006.01) |

(52) U.S. Cl.
CPC ......... *H04N 5/23212* (2013.01); *G03B 13/36* (2013.01); *H04N 5/247* (2013.01); *H04N 5/2258* (2013.01)

(58) Field of Classification Search
CPC combination set(s) only.
See application file for complete search history.

(56) References Cited

U.S. PATENT DOCUMENTS

| 9,986,148 B2 | 5/2018 | Xiao |
|---|---|---|
| 2011/0234768 A1 | 9/2011 | Pan |
| 2012/0257065 A1 | 10/2012 | Velarde et al. |

(Continued)

FOREIGN PATENT DOCUMENTS

| CN | 103246130 | 8/2013 |
|---|---|---|
| CN | 103986876 | 8/2014 |

(Continued)

*Primary Examiner* — Gary C Vieaux
(74) *Attorney, Agent, or Firm* — Hodgson Russ LLP (57) ABSTRACT

A dual-camera focusing method and apparatus, and a terminal device are provided. A dual camera includes a first camera and a second camera. A resolution of the first camera is higher than a resolution of the second camera. The method includes the following operations. The second camera is used for focusing. When the second camera is in focus, a second driving current value of a motor of the second camera is obtained. With the first camera and the second camera having a same in-focus distance, a first driving current value of a motor of the first camera is determined according to the second driving current value. The first driving current value is used to focus the first camera.

20 Claims, 5 Drawing Sheets

(56) References Cited

U.S. PATENT DOCUMENTS

| | | | |
|---|---|---|---|
| 2014/0071330 A1 | 3/2014 | Zhang et al. | |
| 2016/0295097 A1 | 10/2016 | Shanmugavadivelu et al. | |
| 2016/0366355 A1 | 12/2016 | Kato | |
| 2017/0223256 A1 | 8/2017 | Xiao | |
| 2018/0048799 A1 | 2/2018 | Bachar et al. | |
| 2018/0152618 A1* | 5/2018 | Wei | H04N 5/23212 |

FOREIGN PATENT DOCUMENTS

| | | |
|---|---|---|
| CN | 104410783 | 3/2015 |
| CN | 105530421 | 4/2016 |
| CN | 105739054 | 7/2016 |
| CN | 105827944 | 8/2016 |
| CN | 105847693 | 8/2016 |
| CN | 106488137 | 3/2017 |
| EP | 2369392 | 9/2011 |

\* cited by examiner

DUAL-CAMERA FOCUSING METHOD AND APPARATUS, AND TERMINAL DEVICE

CROSS-REFERENCE TO RELATED APPLICATIONS

This application is a continuation of U.S. application Ser. No. 15/805,930, filed Nov. 7, 2017, which claims priority to Chinese Application No. 201611079319.3, filed Nov. 29, 2016. The entire disclosures of the above applications are incorporated herein by reference.

FIELD OF THE DISCLOSURE

The present disclosure relates to a technical field of photography, and more specifically, the present disclosure relates to a dual-camera focusing method and apparatus, and a terminal device.

BACKGROUND OF THE DISCLOSURE

With imaging technology of mobile terminals continually developing, more and more mobile terminals use a dual camera for photography. This is because by combining different cameras to perform dual-camera imaging, photograph qualities or depth of field detection may be enhanced, thereby achieving better photography effects.

When cameras shoot a to-be-photographed object, the dual camera needs to determine a focal length at which clear imaging can be accomplished, to shoot the to-be-photographed object at the focal length. However, in the related art, a time period from an instance when the dual camera begins focusing to an instance when the focal length at which clear imaging can be accomplished is determined is too long—that is, focusing speed is slower. In the related art, the slower focusing speed of the dual camera is disadvantageous to users performing snap shooting, and results in difficulties in capturing instant pictures.

DESCRIPTION OF THE DRAWINGS

Aspects and advantages of the present disclosure become apparent and easy to be understood from the following description of embodiments in conjunction with the accompanying drawings.

DETAILED DESCRIPTION OF THE EMBODIMENTS

Embodiments of the present disclosure are described in detail below and examples of the embodiments are illustrated in the accompanying drawings, wherein same or similar labels throughout the present disclosure represent corresponding same or similar elements or corresponding elements having same or similar functions. The description of the embodiments with reference to the accompanying drawings below is exemplary, aims at illustrating the present disclosure, and cannot be considered as limitations to the present disclosure.

In the following, a dual-camera focusing method and apparatus, and a terminal device, in accordance with embodiments of the present disclosure, are described below with reference to the accompanying drawings.

Figure 1:
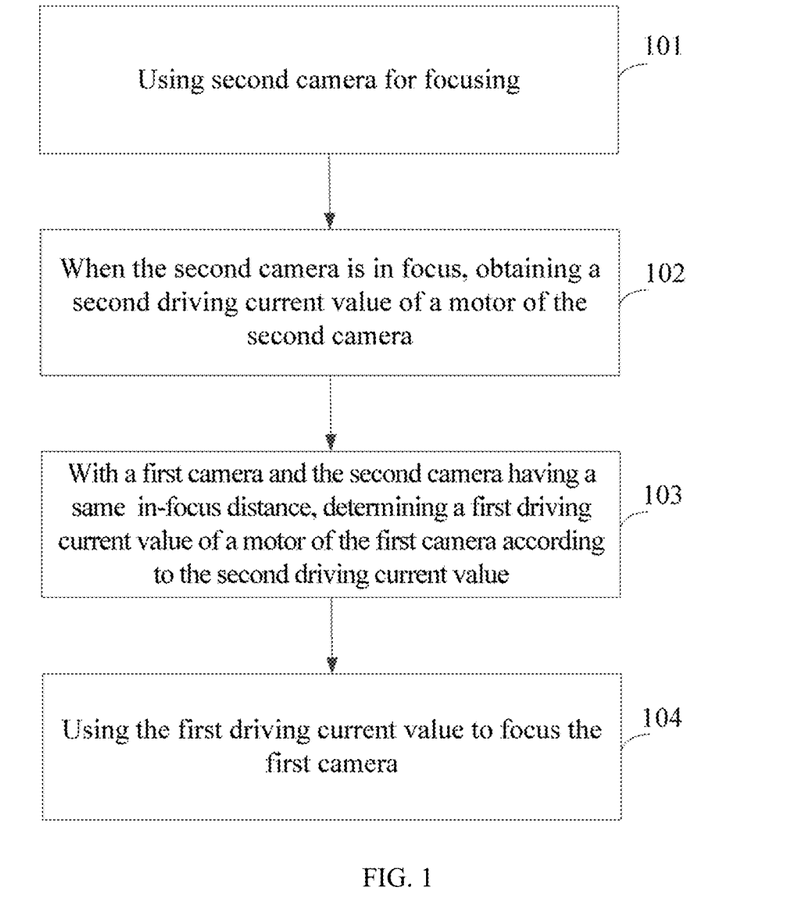
FIG. 1 is a flowchart of a dual-camera focusing method in accordance with an embodiment of the present disclosure.

FIG. 1 is a flowchart of a dual-camera focusing method in accordance with an embodiment of the present disclosure. The dual-camera focusing method uses a dual camera including a first camera and a second camera. As illustrated in FIG. 1, the method includes the following operations.

At block 101, the second camera is used for focusing.

At block 102, when the second camera is in focus, a second driving current value of a motor of the second camera is obtained.

Specifically, when the second camera is detected to be in-focus, a driving current value of the motor of the second camera for driving the second camera to perform focal length-adjusting movement to be at an in-focus distance is obtained. The driving current value is recorded as the second driving current value.

At block 103, with the first camera and the second camera having the same in-focus distance, a first driving current value of a motor of the first camera is determined according to the second driving current value.

Specifically, a relationship between driving current values of the motor of the first camera and driving current values of the motor of the second camera is pre-obtained, so that when the first camera needs focusing, with the first camera and the second camera having the same in-focus distance, the first driving current value corresponding to the second driving current value may be looked up.

Under ordinary situations, when a dual camera is in-focus, even though two cameras of the dual camera have the same in-focus distance, a difference in resolutions of the two cameras, and thereby a difference in sizes of the two cameras, cause the driving current values that the motors are based on when focusing the two cameras to have a certain ratio relationship.

At block 104, the first driving current value is used to focus the first camera.

Further, after the first driving current value is used to focus the first camera, when the first camera is in focus, the first camera is used to take pictures.

In order to clearly describe the dual-camera focusing method as illustrated in FIG. 1, the present embodiment provides a possible application scenario. The first camera of the dual camera is specifically an ordinary camera and the second camera of the dual camera is specifically a dual-photodiode (dual-PD) sensor camera, a.k.a. a dual pixel camera, wherein a resolution of the dual-PD sensor camera is lower than a resolution of the ordinary camera. Therefore, the dual-PD sensor camera can achieve faster focusing speed.

To facilitate understanding, a brief introduction of dual-PD sensor cameras is provided below. Each pixel of the dual-PD sensor cameras is formed by two units. The two units may serve detection points of phase detection focusing, and may also be combined into one pixel for imaging, thereby significantly improving focusing performance during electronic view finding. Dual-PD complementary metal oxide semiconductor (CMOS) sensor cameras are relatively common dual-PD sensor cameras that specifically use CMOS for sensors. The earliest used dual-PD sensor cameras are single lens reflex cameras.

The dual-PD sensor cameras have a disadvantage—that is, the dual-PD sensor cameras output a huge amount of focusing data, two times a number of sensor pixels. If the number of the sensor pixels is high, the amount of the focusing data would be large, and a data-processing capability requirement for terminal device platforms needs to be increased.

A technical problem of the amount of the focusing data of the dual-PD sensor cameras being too large may be solved by using the dual camera. In the present embodiment, the ordinary camera serves as a main camera, and the dual-PD sensor camera, having the lower resolution, serves as an auxiliary camera. Because the dual-PD sensor camera has the lower resolution, an amount of data processed by a terminal device platform is not huge, and enough phase detection focusing information to be shared with the main camera can obtained, thereby increasing focusing speed of the main camera.

In the present embodiment, the second camera is used for focusing. When the second camera is in focus, the second driving current value of the motor of the second camera is obtained. With the first camera and the second camera having the same in-focus distance, the first driving current value of the motor of the first camera is determined according to the second driving current value. The first driving current value is used to focus the first camera. Because the resolution of the second camera is lower, image processing speed of the second camera is faster, thereby enhancing focusing speed and solving the technical problem of the dual camera having slower focusing speed in the related art.

In order to more comprehensively describe methods of embodiments of the present disclosure, a method is described in detail below.

Figure 2:
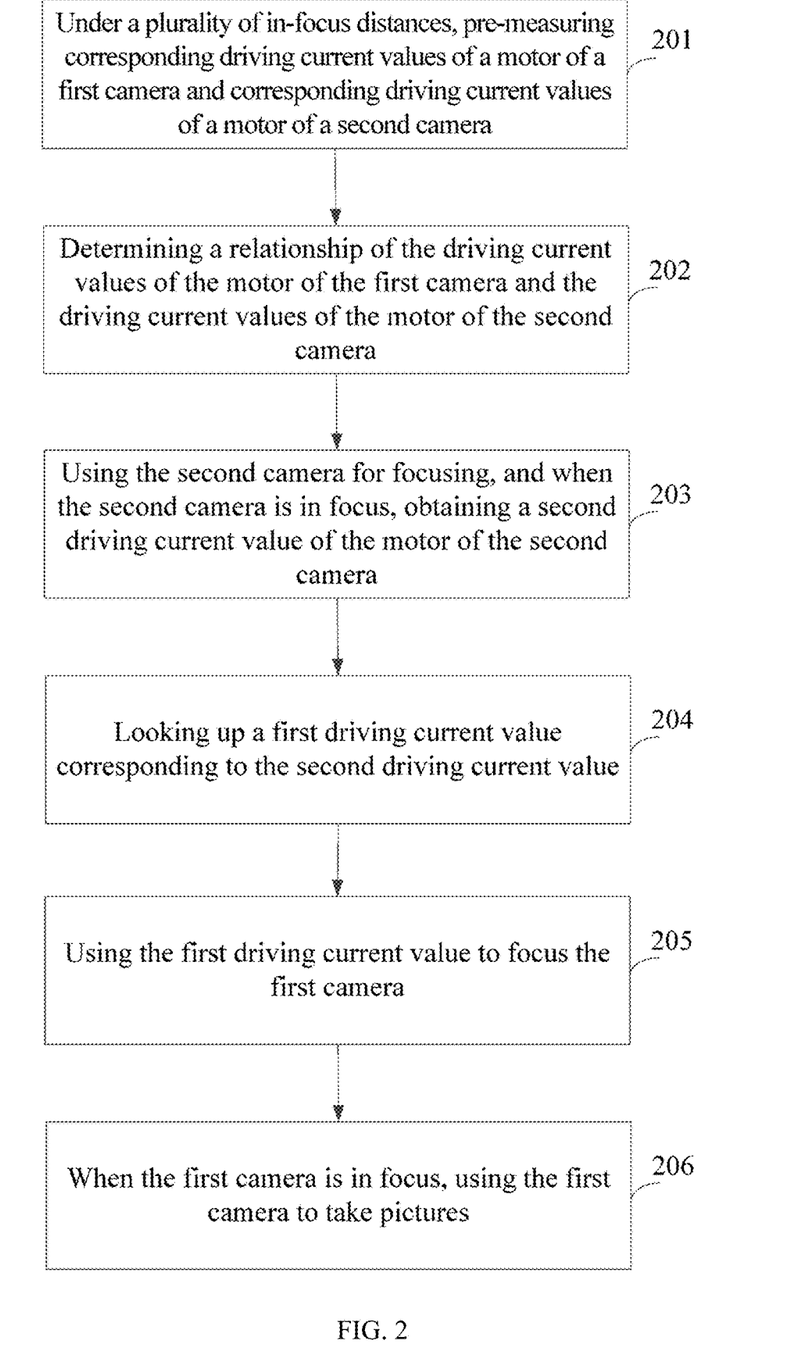
FIG. 2 is a flowchart of a dual-camera focusing method in accordance with another embodiment of the present disclosure.

FIG. 2 is a flowchart of a dual-camera focusing method in accordance with another embodiment of the present disclosure. The dual-camera focusing method uses a dual camera including a first camera and a second camera. As illustrated in FIG. 2, the method includes:

At block 201, under a plurality of in-focus distances, corresponding driving current values of a motor of the first camera and corresponding driving current values of a motor of the second camera are pre-measured.

Figure 3:
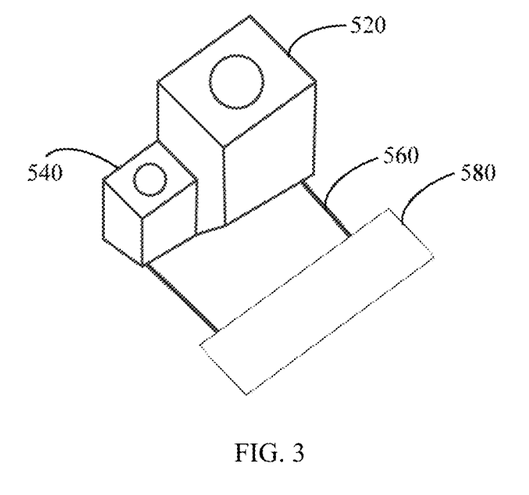
FIG. 3 is a schematic diagram of a dual camera.

Specifically, under the in-focus distances, the corresponding driving current values of the motor of the first camera are pre-measured. Each of the corresponding driving current values of the motor of the first camera is used to drive the first camera to perform focal length-adjusting movement to be at a first in-focus distance of the in-focus distances. Under the in-focus distances, the corresponding driving current values of the motor of the second camera are measured. Each of the corresponding driving current values of the motor of the second camera is used to drive the second camera to perform focal length-adjusting movement to be at a second in-focus distance same as the first in-focus distance. As illustrated in FIG. 3, the first camera of the dual camera is specifically an ordinary camera 520 and the second camera of the dual camera is specifically a dual-PD sensor camera 540. A resolution of the first camera is higher than a resolution of the second camera, and therefore a size of the first camera in FIG. 3 is larger than a size of the second camera. Two cameras of the dual camera may perform respective focusing, and the corresponding driving current values of the motors can be determined under the in-focus distances. The ordinary camera 520 and the dual-PD sensor camera 540 are electrically connected to a camera connector 580 via camera connecting wires 560.

At block 202, a relationship of the driving current values of the motor of the first camera and the driving current values of the motor of the second camera is determined.

Specifically, according to the corresponding driving current values of the motor of the first camera and the corresponding driving current values of the motor of the second camera measured under the in-focus distances, the relationship between the driving current values of the motor of the first camera and the driving current values of the motor of the second camera is determined.

As a possible implementation, within an in-focus distance-driving current value coordinate space, a relationship curve of the in-focus distances and the corresponding driving current values of the motor of the first camera is graphed, and a relationship curve of the in-focus distances and the corresponding driving current values of the motor of the second camera is graphed.

At block 203, the second camera is used for focusing, and when the second camera is in focus, a second driving current value of the motor of the second camera is obtained.

At block 204, a first driving current value corresponding to the second driving current value is looked up.

Specifically, the looking up is performed based on the relationship between the driving current values of the motor of the first camera and the driving current values of the motor of the second camera, so as to determine the first driving current value corresponding to the second driving current value.

At block 205, the first driving current value is used to focus the first camera.

At block 206, when the first camera is in focus, the first camera is used to take pictures.

In the present embodiment, the second camera is used for focusing. When the second camera is in focus, the second driving current value of the motor of the second camera is obtained. With the first camera and the second camera having the same in-focus distance, the first driving current value of the motor of the first camera is determined according to the second driving current value. The first driving current value is used to focus the first camera. Because the resolution of the second camera is lower, image processing speed of the second camera is faster, thereby enhancing focusing speed and solving the technical problem of the dual camera having slower focusing speed in the related art.

Figure 4:
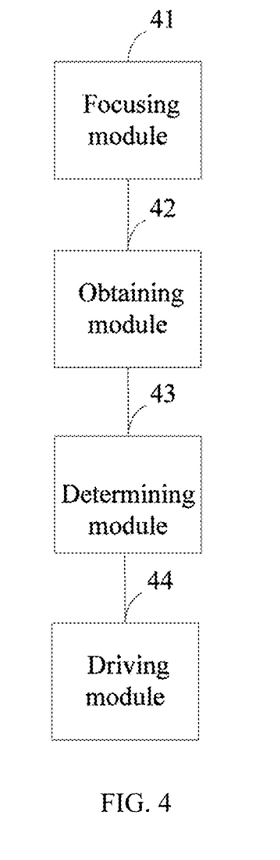
FIG. 4 is a schematic structural diagram of a dual-camera focusing apparatus in accordance with an embodiment of the present disclosure.

In order to implement the foregoing embodiments, the present disclosure provides a dual-camera focusing apparatus. The dual-camera focusing apparatus uses a dual camera including a first camera and a second camera. A resolution of the first camera is higher than a resolution of the second camera. FIG. 4 is a schematic structural diagram of a dual-camera focusing apparatus in accordance with an embodiment of the present disclosure. As illustrated in FIG. 4, the dual-camera focusing apparatus includes a focusing module 41, an obtaining module 42, a determining module 43, and a driving module 44.

The focusing module 41 is configured to use the second camera for focusing.

The obtaining module 42 is configured to, when the second camera is in focus, obtain a second driving current value of a motor of the second camera.

The determining module 43 is configured to, with the first camera and the second camera having a same in-focus distance, determine a first driving current value of a motor of the first camera according to the second driving current value.

The driving module 44 is configured to use the first driving current value to focus the first camera.

It is to be noted that the foregoing description with respect to the embodiment of the dual-camera focusing method is applicable to the dual-camera focusing apparatus of the embodiment of the present disclosure. Principles of implementation are similar and the description is omitted here.

In summary, in the present embodiment, the focusing module uses the second camera for focusing. When the second camera is in focus, the obtaining module obtains the second driving current value of the motor of the second camera. The determining module, with the first camera and the second camera having the same in-focus distance, determines the first driving current value of the motor of the first camera according to the second driving current value. The driving module uses the first driving current value to focus the first camera. Because the resolution of the second camera is lower, image processing speed of the second camera is faster, thereby enhancing focusing speed and solving the technical problem of the dual camera having slower focusing speed in the related art.

Figure 5:
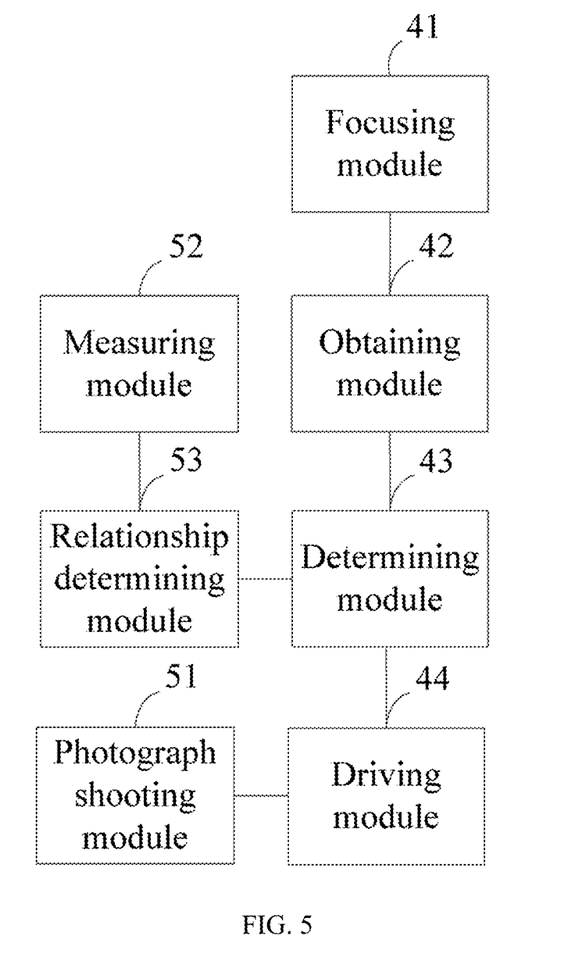
FIG. 5 is a schematic structural diagram of a dual-camera focusing apparatus in accordance with another embodiment of the present disclosure.

Further, FIG. 5 is a schematic structural diagram of a dual-camera focusing apparatus in accordance with another embodiment of the present disclosure. As illustrated in FIG. 5, the dual-camera focusing apparatus, with a basis as illustrated in FIG. 4, further includes a picture taking module 51.

The picture taking module 51 is configured to, when the first camera is in focus, use the first camera to take pictures.

Further, the dual-camera focusing apparatus further includes a measuring module 52 and a relationship determining module 53.

The measuring module 52 is configured to, under a plurality of in-focus distances, pre-measure corresponding driving current values of the motor of the first camera, and measure corresponding driving current values of the motor of the second camera. Each of the corresponding driving current values of the motor of the first camera is used to drive the first camera to perform focal length-adjusting movement to be at a first in-focus distance of the in-focus distances. Each of the corresponding driving current values of the motor of the second camera is used to drive the second camera to perform focal length-adjusting movement to be at a second in-focus distance same as the first in-focus distance.

The relationship determining module 53 is configured to, according to the corresponding driving current values of the motor of the first camera and the corresponding driving current values of the motor of the second camera measured under the in-focus distances, determine a relationship between the driving current values of the motor of the first camera and the driving current values of the motor of the second camera.

Specifically, the relationship determining module 53 is specifically configured to, within an in-focus distance-driving current value coordinate space, graph a relationship curve of the in-focus distances and the corresponding driving current values of the motor of the first camera, and graph a relationship curve of the in-focus distances and the corresponding driving current values of the motor of the second camera.

Based on the above, the determining module 43 is specifically configured to determine the first driving current value corresponding to the second driving current value. The determination is based on the relationship between the driving current values of the motor of the first camera and the driving current values of the motor of the second camera.

It is to be noted that the foregoing description with respect to the embodiment of the dual-camera focusing method is applicable to the dual-camera focusing apparatus of the embodiment of the present disclosure. Principles of implementation are similar and the description is omitted here.

In summary, in the present embodiment, the focusing module uses the second camera for focusing. When the second camera is in focus, the obtaining module obtains the second driving current value of the motor of the second camera. The determining module, with the first camera and the second camera having the same in-focus distance, determines the first driving current value of the motor of the first camera according to the second driving current value. The driving module uses the first driving current value to focus the first camera. Because the resolution of the second camera is lower, image processing speed of the second camera is faster, thereby enhancing focusing speed and solving the technical problem of the dual camera having slower focusing speed in the related art.

Figure 6:
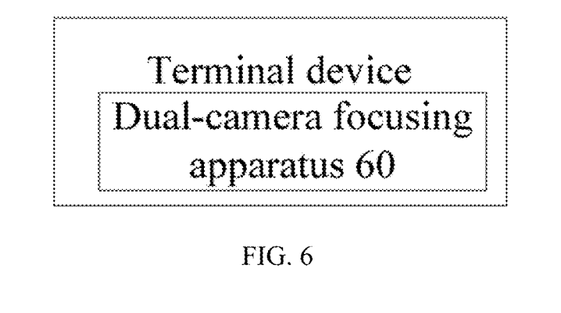
FIG. 6 is a schematic structural diagram of a terminal device in accordance with an embodiment of the present disclosure.

In order to implement the foregoing embodiments, the present disclosure provides a terminal device. FIG. 6 is a schematic structural diagram of a terminal device in accordance with an embodiment of the present disclosure. As illustrated in FIG. 6, the terminal device includes the dual-camera focusing apparatus 60 as illustrated in FIG. 4 or FIG. 5.

It is to be noted that the foregoing description with respect to the embodiments of the dual-camera focusing apparatuses is applicable to the terminal device of the embodiment of the present disclosure. Principles of implementation are similar and the description is omitted here.

In summary, in the present embodiment, the focusing module uses the second camera for focusing. When the second camera is in focus, the obtaining module obtains the second driving current value of the motor of the second camera. The determining module, with the first camera and the second camera having the same in-focus distance, determines the first driving current value of the motor of the first camera according to the second driving current value. The driving module uses the first driving current value to focus the first camera. Because the resolution of the second camera is lower, image processing speed of the second camera is faster, thereby enhancing focusing speed and solving the technical problem of the dual camera having slower focusing speed in the related art.

Figure 7:
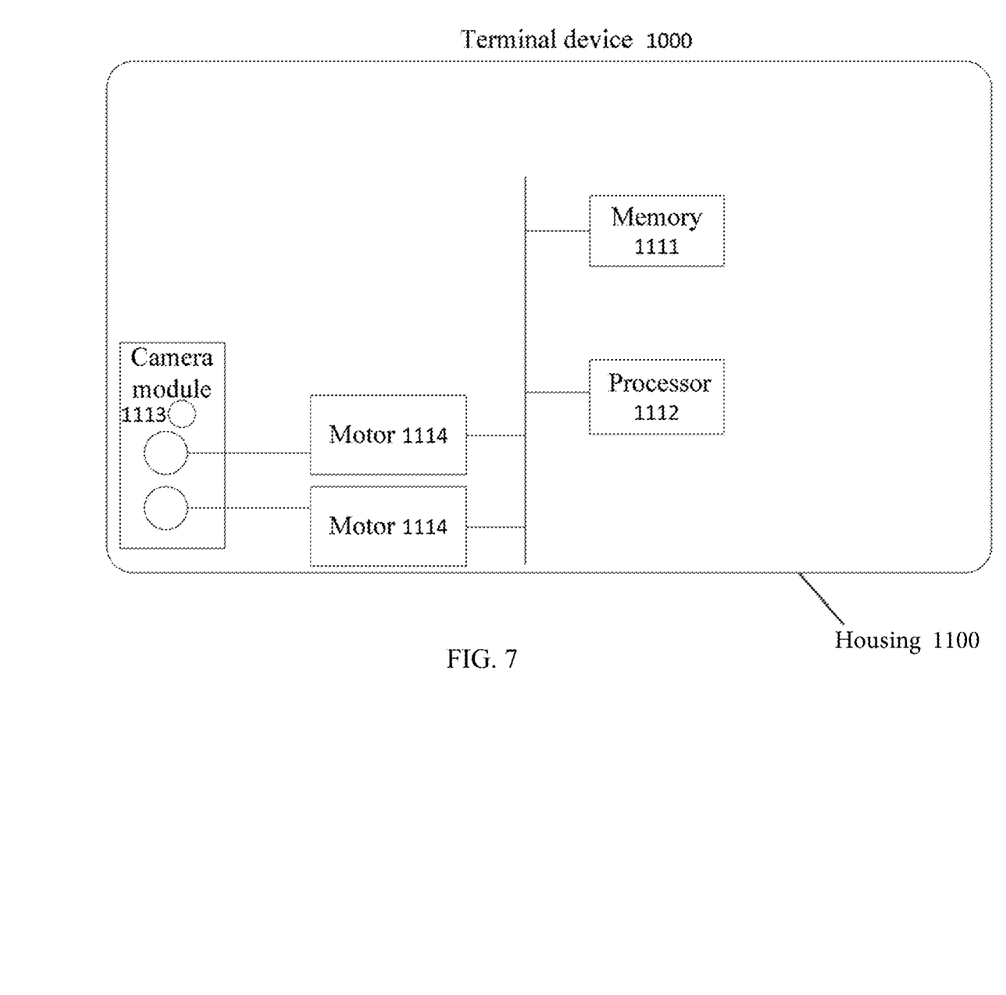
FIG. 7 is a schematic structural diagram of a terminal device in accordance with another embodiment of the present disclosure.

In order to implement the foregoing embodiments, the present disclosure provides another terminal device. FIG. 7 is a schematic structural diagram of a terminal device in accordance with another embodiment of the present disclosure. As illustrated in FIG. 7, the terminal device 1000 includes a housing 1100, and a memory 1111, a processor 1112, a camera module 1113, and motors 1114 located in the housing 1100.

The camera module 1113 includes a first camera and a second camera. A resolution of the first camera is higher than a resolution of the second camera.

The memory 1111 stores executable program instructions. The processor 1112 is coupled to the memory 1111 to access the executable program instructions and when running the executable program instructions, the processor 1112 is configured to perform the following operations.

The second camera is used for focusing.

When the second camera is in focus, a second driving current value of a motor of the second camera is obtained.

With the first camera and the second camera having a same in-focus distance, a first driving current value of a motor of the first camera is determined according to the second driving current value.

The first driving current value is used to focus the first camera.

Further, as a possible implementation, the second camera is a dual-PD sensor camera.

It is to be noted that the foregoing description with respect to the embodiments of the dual-camera focusing methods are applicable to the terminal device 1000 of the embodiment of the present disclosure. Principles of implementation are similar and the description is omitted here.

In summary, in the present embodiment, the second camera having the lower resolution is used for focusing. According to the second driving current value of the motor of the second camera obtained when the second camera is in focus, the first driving current value of the motor of the first camera is determined. The first driving current value is used to focus the first camera, realizing focusing of the first camera. Because the resolution of the second camera is lower, image processing speed of the second camera is faster, thereby enhancing focusing speed and solving the technical problem of the dual camera having slower focusing speed in the related art.

In the description of the present disclosure, terms such as "an embodiment", "some embodiments", "an example", "a specific example", and "some examples" referred to in the description mean at least one embodiment or example of the present disclosure includes a specific feature, structure, material or characteristic described in combination with an embodiment or example. In the present disclosure, an illustrative expression of the aforementioned terms does not need to be focused on the same embodiment or example. Further, the specific feature, structure, material or characteristic described may be adequately combined in any of or a plurality of embodiments and examples. In addition, in a situation where conflicts between each other do not exist, persons skilled in the art may combine and group different embodiments and examples with features of different embodiments and examples described in the present disclosure.

Although the embodiments of the present disclosure have been illustrated and described above, it is to be appreciated that the foregoing embodiments are illustrative and cannot be considered as limitations to the present disclosure. Persons skilled in the art may change, modify, replace and vary the foregoing embodiments within the scope of the present disclosure.

What is claimed is:

1. A dual-camera focusing method using a dual camera that comprise a first camera and a second camera, the method comprising:
   using the second camera for focusing;
   when the second camera is in focus, obtaining a second driving current value of a motor of the second camera;
   with the first camera and the second camera having a same in-focus distance, determining a first driving current value of a motor of the first camera according to the second driving current value, a preset first relationship curve and a preset second relationship curve; the preset first relationship curve being between in-focus distances and first driving current values, and the preset second relationship curve being between in-focus distances and second driving current values; and
   using the first driving current value to focus the first camera.

2. The dual-camera focusing method according to claim 1, wherein after the operation of using the first driving current value to focus the first camera, the method further comprises:
   when the first camera is in focus, using the first camera to take pictures.

3. The dual-camera focusing method according to claim 1, wherein before the operation of determining the first driving current value of the motor of the first camera according to the second driving current value, the preset first relationship curve and the preset second relationship curve, with the first camera and the second camera having the same in-focus distance, the method further comprises:
   under a plurality of in-focus distances,
   pre-measuring corresponding first driving current values of the motor of the first camera, wherein each of the corresponding first driving current values of the motor of the first camera is used to drive the first camera to perform focal length-adjusting movement to be at a first in-focus distance of the in-focus distances, and
   measuring corresponding second driving current values of the motor of the second camera, wherein each of the corresponding second driving current values of the motor of the second camera is used to drive the second camera to perform focal length-adjusting movement to be at a second in-focus distance same as the first in-focus distance.

4. The dual-camera focusing method according to claim 1, wherein the operation of determining the first driving current value of the motor of the first camera according to the second driving current value and the preset first relationship curve and the preset second relationship curve, with the first camera and the second camera having the same in-focus distance comprises:
   determining the first driving current value corresponding to the second driving current value based on the relationship between the first driving current values of the motor of the first camera and the second driving current values of the motor of the second camera.

5. The dual-camera focusing method according to claim 1, wherein the second camera is a dual-photodiode (dual-PD) sensor camera.

6. The dual-camera focusing method according to claim 5, wherein the first camera is a camera other than a dual-PD sensor camera.

7. The dual-camera focusing method according to claim 1, wherein a resolution of the first camera is higher than a resolution of the second camera.

8. A terminal device, comprising:
   a first camera;
   a second camera;
   a memory storing executable program instructions;
   a processor coupled to the memory, wherein when running the executable program instructions, the processor is configured as a dual-camera focusing apparatus comprising:
     a focusing module configured to use the second camera for focusing;
     an obtaining module configured to, when the second camera is in focus, obtain a second driving current value of a motor of the second camera;
     a determining module configured to, with the first camera and the second camera having a same in-focus distance, determine a first driving current value of a motor of the first camera according to the second driving current value; a preset first relationship curve and a preset second relationship curve; the preset first relationship curve being between in-focus distances and first driving current values, and the preset second relationship curve being between in-focus distances and second driving current values; and a driving module configured to use the first driving current value to focus the first camera.

9. The terminal device according to claim 8, wherein the dual-camera focusing apparatus further includes:
a picture taking module configured to, when the first camera is in focus, use the first camera to take pictures.

10. The terminal device according to claim 8, wherein the dual-camera focusing apparatus further comprises:
a measuring module configured to, under a plurality of in-focus distances, pre-measure corresponding first driving current values of the motor of the first camera, wherein each of the corresponding first driving current values of the motor of the first camera is used to drive the first camera to perform focal length-adjusting movement to be at a first in-focus distance of the in-focus distances, and measure corresponding second driving current values of the motor of the second camera, wherein each of the corresponding second driving current values of the motor of the second camera is used to drive the second camera to perform focal length-adjusting movement to be at a second in-focus distance same as the first in-focus distance.

11. The terminal device according to claim 8, wherein the determining module is further configured to:
determine the first driving current value corresponding to the second driving current value based on the relationship between the first driving current values of the motor of the first camera and the second driving current values of the motor of the second camera.

12. The terminal device according to claim 8, wherein the second camera is a dual-photodiode (dual-PD) sensor camera.

13. The terminal device according to claim 12, wherein the first camera is a camera other than a dual-PD sensor camera.

14. The terminal device according to claim 8, wherein a resolution of the first camera is higher than a resolution of the second camera.

15. A non-transitory computer-readable storage medium having stored therein instructions that, when executed by a processor of a device having a first camera and a second camera, the device is configured to:
use the second camera for focusing;
when the second camera is in focus, obtain a second driving current value of a motor of the second camera;
with the first camera and the second camera having a same in-focus distance, determine a first driving current value of a motor of the first camera according to the second driving current value, a preset first relationship curve and a preset second relationship curve; the preset first relationship curve being between in-focus distances and first driving current values, and the preset second relationship curve being between in-focus distances and second driving current values; and
use the first driving current value to focus the first camera.

16. The non-transitory computer-readable storage medium according to claim 15, wherein after the operation of using the first driving current value to focus the first camera, the device is further configured to:
when the first camera is in focus, use the first camera to take pictures.

17. The non-transitory computer-readable storage medium according to claim 15, wherein before the operation of determining the first driving current value of the motor of the first camera according to the second driving current value, the preset first relationship curve and the preset second relationship curve, with the first camera and the second camera having the same in-focus distance, the device is further configured to:
under a plurality of in-focus distances,
pre-measure corresponding first driving current values of the motor of the first camera, wherein each of the corresponding first driving current values of the motor of the first camera is used to drive the first camera to perform focal length-adjusting movement to be at a first in-focus distance of the in-focus distances, and
measure corresponding second driving current values of the motor of the second camera, wherein each of the corresponding second driving current values of the motor of the second camera is used to drive the second camera to perform focal length-adjusting movement to be at a second in-focus distance same as the first in-focus distance.

18. The non-transitory computer-readable storage medium according to claim 15, wherein the device is configured to determine the first driving current value of the motor of the first camera according to the second driving current value and the preset first relationship curve and the preset second relationship curve, with the first camera and the second camera having the same in-focus distance by operations of:
determining the first driving current value corresponding to the second driving current value based on the relationship between the first driving current values of the motor of the first camera and the second driving current values of the motor of the second camera.

19. The non-transitory computer-readable storage medium according to claim 15, wherein the second camera is a dual-photodiode (dual-PD) sensor camera and the first camera is a camera other than a dual-PD sensor camera.

20. The non-transitory computer-readable storage medium according to claim 15, wherein a resolution of the first camera is higher than a resolution of the second camera.

* * * * *